Aug. 10, 1954     A. J. SANDERSON     2,685,876
SUPPORT FOR WALLPAPER STEAMER
Filed July 27, 1951
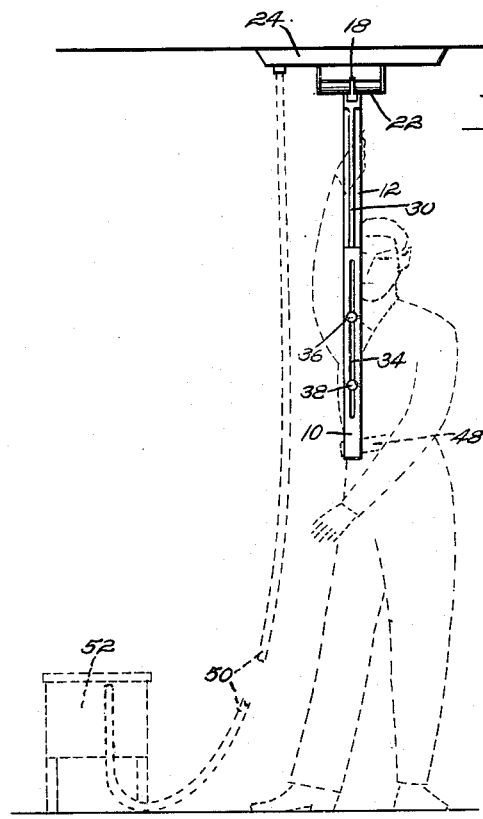
Fig. 1.
Fig. 3.
Fig. 2.
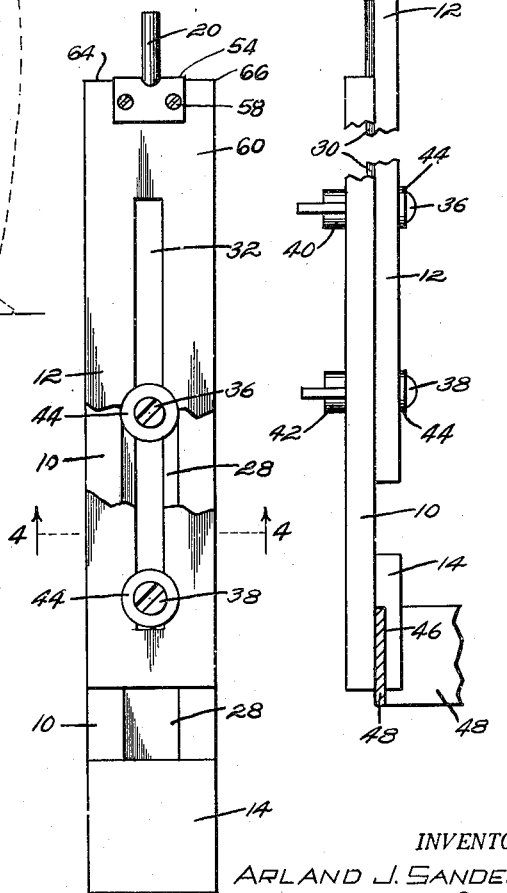
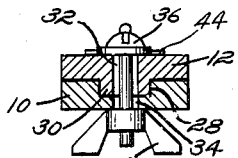
Fig. 4.
INVENTOR.
ARLAND J. SANDERSON
BY *Arthur H. Sturges*
*Attorney.*

Patented Aug. 10, 1954

2,685,876

UNITED STATES PATENT OFFICE 2,685,876

SUPPORT FOR WALLPAPER STEAMER

Arland J. Sanderson, Omaha, Nebr.

Application July 27, 1951, Serial No. 238,961

1 Claim. (Cl. 126—271.1)

1

This invention relates to wall paper removing equipment particularly of the type using steam confined in a tray or pan positioned against the wall paper whereby the paper is thoroughly saturated with the steam and the paste or other adhesive retaining the paper on the wall is liquidated; and in particular the device of this invention includes an extensible belt supported handle and means for removably attaching the handle to the pan whereby accidental tilting of the pan is prevented.

The purpose of this invention is to eliminate the necessity of holding a steam filled pan against the surface of a ceiling by the conventional handle positioned on the back of the pan, and at the same time make it possible to move the pan back and forth over the ceiling.

In the conventional type of steam applying pan or tray the pan is held by the hand of the operator with the hand gripping a comparatively small handle on the back of the pan, and when extensible or other types of mechanical handles are used there is danger of the handle permitting the pan to slip so that the steam burns the operator.

With this thought in mind this invention contemplates a wall paper removing outfit including a steam pan having a steam supply hose extended therefrom and having a handle extended from the under surface, an extensible handle having means on the upper end for holding the handle of the pan without danger of the pan tilting, and a belt on which the lower end of the extensible handle is positioned whereby the outfit is supported from the waist of an operator and the hands of the operator are free to slide the pan along the ceiling.

The object of this invention is, therefore, to provide means for constructing an extensible handle whereby with the handle supported on a belt around the waist of an operator a steam pan positioned on the upper end of the handle is in contact with the ceiling.

Another object of the invention is to provide a belt supported extensible handle for steam pans that is adapted to be used with conventional pans now in use.

A further object of the invention is to provide a belt supported handle for holding wall paper removing steam pans that is readily adjustable for ceilings and operators of different heighths.

A still further object of the invention is to provide an extensible handle for holding wall paper removing steam pans from the waist of an operator, which is of a simple and economical construction.

With these and other objects and advantages in view the invention embodies a bar having an elongated centrally positioned slot therein with a belt receiving socket in the lower end, a similar

2 bar having an elongated tongue extended into the slot of the former or lower bar, bolts adjustably connecting the bars, a pin on the upper end of said similar or upper bar, and fingers also extended from the upper end of the upper bar for gripping a handle of a wall paper removing steam pan.

Other features and advantages of the invention will appear from the following description taken in connection with the drawings, wherein:

Figure 1 is a view illustrating the use of the outfit and showing a front elevational view of the extensible handle.

Figure 2 is a rear elevational view of the extensible handle with parts broken away, and showing the handle on an enlarged scale.

Figure 3 is a side elevational view of the handle also with parts broken away, showing the upper end of the handle extended in dotted lines, and showing the supporting belt and handle of the steam pan in dotted lines.

Figure 4 is a cross section through the extensible handle taken on line 4—4 of Figure 2.

Referring now to the drawings wherein like reference characters denote corresponding parts the wall paper removing steam pan supporting handle of this invention includes an elongated lower bar 10, an elongated upper bar 12 slidably mounted on the lower bar, a hook-like member 14 providing a socket for a supporting belt, a pin 16 on the upper end of the bar 12, and outwardly and upwardly extended fingers 18 and 20, also positioned on the upper end of the upper bar 12 and adapted to provide a cradle for a handle 22 of a steam pan 24 with the pin 16 extended into an opening 26 in the under side of the handle 22.

The lower bar 10 is provided with an elongated centrally positioned slot 28 and a tongue 30 extended from the upper bar 12 is positioned in the slot and adapted to slide longitudinally therein. The upper bar 12 is also provided with a centrally positioned elongated slot 32, which extends through the tongue, and a corresponding slot 34 extends from the base of the slot 28 through the outer surface of the lower bar 10, as shown in Figure 4. Bolts 36 and 38 extend through the slots 32 and 34 for adjustably holding the bars together, and the threaded ends of the bolts are provided with wing nuts 40 and 42. Washers 44 are positioned under the heads of the bolts, and as shown in Figure 2, the washers extend beyond the width of the slot 32 to provide bearing surfaces against the outer face of the upper bar.

The hook-like member 14 provides a socket 46 that receives a belt 48 and with the belt positioned around an operator the length of the extensible handle is adjusted so that the upper surface of a pan 24 securely mounted on the upper end of the upper bar may be held against the ceiling.

The steam pan 24 is provided with a supply hose 50 which extends to a generator 52 or other means for supplying steam, and with the device positioned as shown in Figure 1 the operator adjusts the position of the pan by means of the wing nuts 40 and 42, until the pan is comfortably held against the ceiling.

The steam pan is conventional, and the only change being in providing the opening 26 in the handle, into which the pin 16 is placed. The pin prevents the pan tilting from a horizontal plane and the fingers 18 and 20 prevent the pan twisting or turning on the handle.

As illustrated in Figure 3, the handle 22 nests between the fingers 18 and 20, the fingers being curved outwardly from plates 54 and 56, respectively, which are secured by screws 58 against side surfaces 60 and 62 of the bar 12. The bar 12, which is rectangular-shaped in cross section is relatively wide whereby corners 64 and 66 on the upper end of the bar are spaced sufficiently to support the steaming pan 24 longitudinally.

From the foregoing description it is thought to be obvious that a wall paper steam pan support constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having thus fully described the invention what I claim as new and desire to secure by Letters Patent, is:

As an article of manufacture a supporting handle for use in holding a wall paper steamer pan having a handle; comprising a vertically disposed bar, rectangular-shaped in cross section, having elongated side surfaces and relatively short end surfaces, a longitudinally disposed pin extended from the end of the bar, and plates positioned against said side surfaces of the bar and secured to the bar, said plates having fingers extended from upper edges thereof and said fingers being connected to the plates with arcuate outwardly curved sections whereby the distance between the fingers is greater than the thickness of the bar, said fingers and pin being in a plane perpendicular to the side surfaces of the bar and positioned midway between the edges of the side surfaces of the bar whereby with a handle of a steamer pan positioned on the end of the bar with said pin extended into an opening in the handle the fingers prevent lateral tilting of the pan and the corners at the edges of the bar prevent longitudinal tilting of the pan.

References Cited in the file of this patent

UNITED STATES PATENTS

| Number | Name | Date |
| --- | --- | --- |
| 210,084 | Blake | Nov. 19, 1878 |
| 281,405 | Seidel | July 17, 1883 |
| 423,187 | Spitz | Mar. 11, 1890 |
| 1,121,657 | Parker | Dec. 22, 1914 |
| 1,785,564 | Schweigert | Dec. 16, 1930 |
| 2,273,813 | Barber | Feb. 24, 1942 |
| 2,290,450 | Renschin | July 21, 1942 |
| 2,332,240 | Lavalley | Oct. 19, 1943 |

FOREIGN PATENTS

| Number | Country | Date |
| --- | --- | --- |
| 3,889 | Great Britain | of 1909 |
| 8,336 | Great Britain | of 1887 |
| 529,499 | Great Britain | Nov. 21, 1940 |
| 788,053 | France | Oct. 3, 1935 |